Patented July 28, 1942

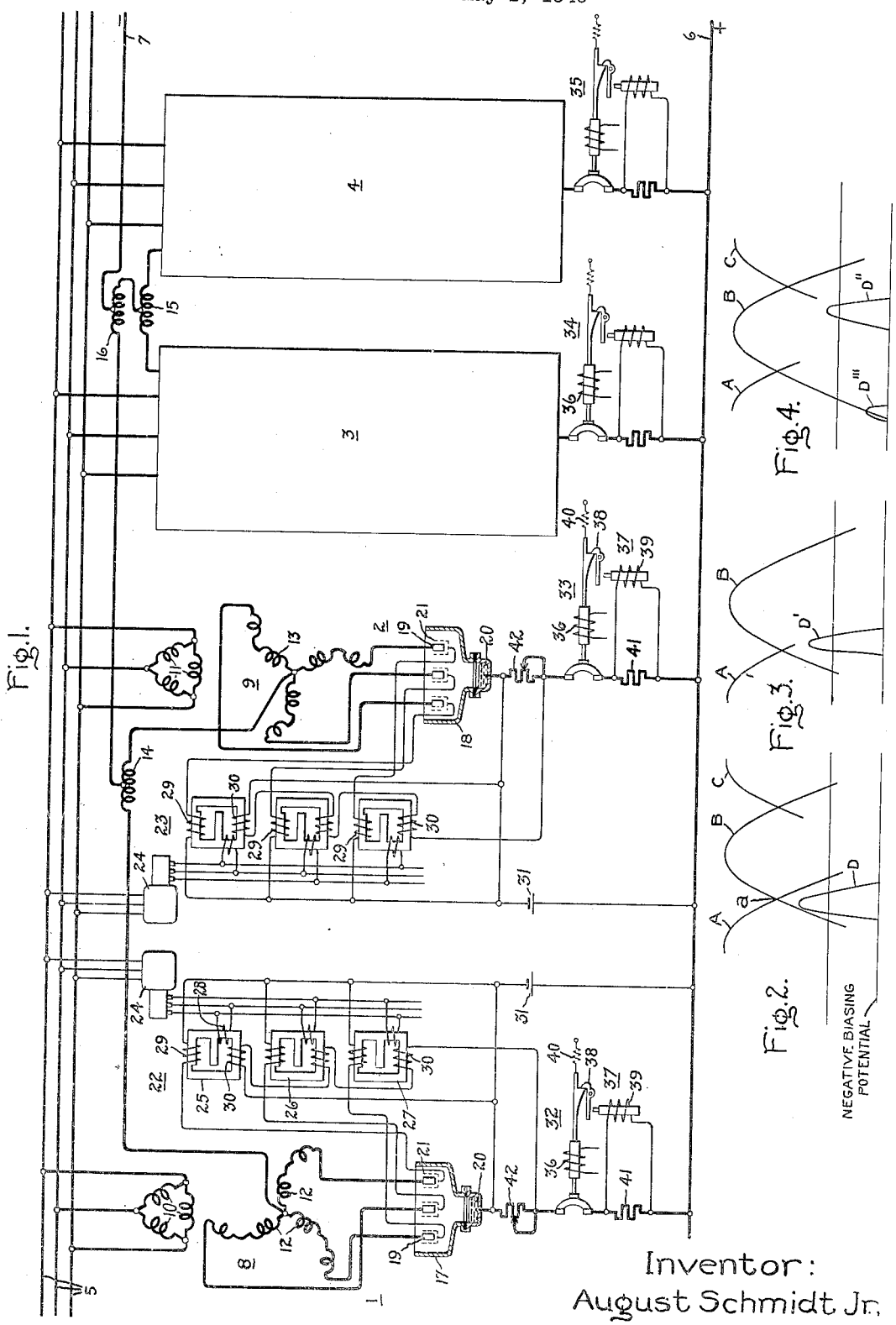

2,291,349

UNITED STATES PATENT OFFICE 2,291,349

ELECTRIC VALVE PROTECTIVE SYSTEM

August Schmidt, Jr., Niskayuna, N. Y., assignor to General Electric Company, a corporation of New York Application May 1, 1940, Serial No. 332,749

11 Claims. (Cl. 175—363)

My invention relates to electric valve circuits and more particularly to protective apparatus for electric valve translating systems of the type employing ionizable mediums such as gases or vapors.

In electric valve translating systems for transmitting power between alternating and direct current circuits, such as rectifiers, for energizing a direct current load circuit from an alternating current supply circuit, it is frequently desirable to operate electric valve means or groups of electric valves in parallel. Although occurring infrequently, it is necessary to protect electric valve apparatus during arc-back conditions. In accordance with the teachings of my invention described hereinafter, I provide new and improved protective apparatus of simplified construction and arrangement which protects electric valve translating apparatus during arc-back conditions.

It is an object of my invention to provide new and improved electric valve translating apparatus.

It is another object of my invention to provide a new and improved protective system for electric valve translating apparatus to protect the apparatus under arc-back conditions and under overload conditions.

It is a further object of my invention to provide a protective system for groups of parallel operating electric valve means, such as rectifiers, under arc-back conditions.

Briefly stated, in the illustrated embodiment of my invention I provide new and improved protective systems for parallel operating electric valve means wherein a faulty electric valve is rapidly isolated or disconnected from one of the associated principal circuits, and wherein the load transmitted by the faulty electric valve means and the normal electric valve means is temporarily reduced until the faulty electric valve means is disconnected, whereupon the load is automatically assumed by the normal electric valve means. Each of the electric valve means is provided with a control circuit which is directly controlled in response to the current conducted by the associated electric valve means and effects a reduction or decrease in the power transmitted by that electric valve means so long as its associated circuit interrupting means is in the closed circuit position or until the current flow occasioned by the arc-back of another electric valve means decreases to the normal range of value.

For a better understanding of my invention, reference may be had to the following description taken in connection with the accompanying drawing, and its scope will be pointed out in the appended claims. Fig. 1 diagrammatically illustrates an embodiment of my invention as applied to a group of parallel operating rectifiers for energizing a direct current load circuit from an alternating current supply circuit, and Figs. 2-4, inclusive, represent certain operating characteristics of the embodiment of my invention shown in Fig. 1.

Referring now more particularly to the embodiment of my invention diagrammatically illustrated in Fig. 1, a group of electric valve translating units or rectifiers 1, 2, 3 and 4 are connected to operate in parallel relation to transmit power between an alternating current circuit 5 and a direct current circuit comprising conductors 6 and 7. The electric valve rectifiers 1 and 2 are shown in detail and it is to be understood that the rectifiers 3 and 4 may be of similar construction and arrangement. Each of the electric valve translating units or rectifying circuits, such as rectifiers 1 and 2, comprises an inductive network or transformer 8 and 9 having primary windings 10 and 11 and secondary windings 12 and 13, respectively. The secondary windings 12 and 13 may be connected in a zigzag relationship to provide a double wye system inter-connected through an interphase transformer 14. The inductive networks for the rectifiers 3 and 4 may also be connected through a similar interphase transformer 15 and the interphase transformers 14 and 15 in turn may be connected to a third interphase transformer 16 so that the complete system operates as a quadruple three phase rectifier when power is transmitted from the alternating current circuit 5 to the direct current circuit. Each of the rectifiers, of course, comprises an electric valve means, such as electric valve means 17 and 18, which are preferably of the type employing an ionizable medium such as mercury vapor, and each may comprise a plurality of anodes 19, a cathode 20 which may be of the mercury pool type, and a plurality of control members or grids 21. Although not illustrated in the drawing, it will be understood that the electric valve means 17 and 18 may also be provided with arc initiating and arc maintaining or holding devices to initiate ionization of the mercury vapor and to maintain the mercury vapor in an ionized state.

In addition, each of the electric valve rectifiers is provided with a control circuit. For example, rectifiers 1 and 2 are provided with control circuits 22 and 23 which control or determine the conductivities of the electric valve means 17 and 18, respectively. Each of the control circuits may comprise a suitable phase shifting device such as a rotary phase shifter 24 comprising relatively movable and adjustable primary and secondary windings of the distributed type. I also provide suitable means for impressing on the grids 21 control voltages, such as periodic or alternating voltages. This means may comprise a plurality of phase shifting devices such as saturable inductive devices 25, 26 and 27, each having a primary exciting winding 28, and a secondary winding 29 in which there is induced an alternating voltage of peaked wave form and which is variable in phase with respect to the voltage of the alternating current circuit 5 or variable in phase with respect to the voltage impressed upon the associated anode. The phase of this periodic voltage of peaked wave form is determined by the energization of a control winding 30. The saturable inductive devices 25—27 may be of the type disclosed and claimed in United States Letters Patent No. 1,918,173, granted July 11, 1933, upon an application of Burnice D. Bedford, and which is assigned to the assignee of this application.

I also provide a suitable source of negative unidirectional biasing potential 31 for each of the electric valve rectifying circuits. This source of biasing potential serves to effect the desired resultant phase displacement between the periodic voltages of peaked wave form and also serves as a source of arc suppressing voltage when the periodic voltages of peaked wave form induced in windings 29 are substantially suppressed during arc-back conditions, thereby impressing on the control grids 21 a substantially negative voltage which suppresses the arc within the electric valve means.

Associated with the electric valve means 1—4, I provide a plurality of circuit breakers or circuit interrupting means 32—35, respectively. Each of these circuit interrupting means comprises a closing coil 36, a tripping structure 37 comprising a latch 38 and an actuating coil 39 which when energized releases the circuit breaker to be moved to the open circuit position by means of a suitable actuating member such as a spring 40.

As an agency for moving the circuit interrupting means 32 to the open circuit position in response to either arc-back or reverse current or overload current, I employ suitable current responsive means, such as a shunt 41, which produces a voltage for effecting the proper energization of the actuating or trip coil 39. This circuit may be designed to operate in response to a predetermined magnitude of current transmitted so that the circuit interrupting means is released to the open circuit position under overload or arc-back conditions.

I provide suitable current responsive means connected in series relation with the electric valve means, such as a shunt 42, which modifies the action of the associated control circuits, such as control circuit 22 associated with rectifier 1, to reduce the amount of power transmitted by that electric valve means until the circuit interrupting means 32 is moved to the open circuit position and only so long as that circuit interrupting means is in the closed circuit position.

The magnitude of the resistance 42 may be adjusted in conjunction with the phase shifter 24 so that the periodic voltages of peaked wave form induced in windings 29 have an appreciable angle of lead relative to that position of the control voltage which produces the maximum output voltage of the electric valve means. The variable energization of the control windings 30 under overload conditions and under arc-back conditions retards, or advances and reduces in magnitude, the control voltage substantially to reduce the load transmitted by that electric valve means, or to suppress the arc, thereby offering highly satisfactory protection for the electric valve means under abnormal operating conditions.

The operation of the embodiment of my invention shown in Fig. 1 will be explained by considering the system when it is operating as a rectifying system to transmit unidirectional current to a direct current load circuit comprising conductors 6 and 7. The rectifiers 1, 2, 3 and 4 will operate in parallel relationship so long as the system is not subjected to an arc-back condition or a severe overload. It is well understood by those skilled in the art that when a plurality of electric valve rectifiers are operating in parallel, upon the occurrence of an arc-back condition on one of the electric valve means the remaining or normal electric valves are subjected to a severe overload sometimes approaching three to four times the magnitude of the normal or full load rating. Consequently, it is desirable not only to suppress the arc in a faulty electric valve means and to isolate that unit, but also to reduce the load upon the normal electric valve means until the faulty unit has been isolated from the system. This broad feature of electric valve control apparatus is disclosed and broadly claimed in a copending application of Daniel C. Hoffman et al, Serial No. 313,384, filed January 11, 1940, and which is assigned to the assignee of the present application. Control systems operated in accordance with my invention offer decided advantages in apparatus economy and simplicity of structure, and these advantages will be more fully appreciated in view of the following description of the operation.

If it be assumed that the rectifiers 1—4 are operating in parallel and that an arc-back condition occurs upon the electric valve means 17, the reverse current conducted by that electric valve means is of considerable magnitude and effects sufficient energization of the actuating coil 39 to trip the circuit interrupting means 32 to the open circuit position, thereby isolating that unit. However, prior to the actual interruption of the circuit by circuit interrupting means 32, the action of the control circuit 22 has been modified to suppress the arc and to render the electric valve means 17 non-conductive. The transmission of the reverse current through the shunt 42, of course, effects the transmission of a reverse current through the control windings 30 of the saturable inductive devices 25—27 and hence reduces the magnitude of the periodic voltages of peaked wave form furnished by windings 29. The negative biasing potential produced by the battery 41 then predominates and produces a negative arc-suppressing voltage on the grids 21, thereby deionizing the mercury vapor. As soon as the circuit interrupting means has been moved to the open circuit position, it will be understood of course that the phase of the periodic voltage of peaked wave form induced in windings 29 will be restored to the desired value to preset or reestablish the desired conductivity of the electric valve means 17 so that it may be subsequently placed in service by the proper energization of the closing coil 36.

This feature of the operation of my invention may be more fully explained by referring to the operating characteristics represented in Figs. 2, 3 and 4. The curves A, B and C represent the anode-cathode voltages applied to the three anodes of the electric valve means 17. Curve D represents the phase of one of the periodic voltages of peaked wave form, such as the voltage produced by winding 29 of the saturable inductive device 25 under no load operating conditions. That is, the resistance 42 and the phase shifter 24 are adjusted so that the control voltage has an appreciable angle of lead relative to the point $a$ which corresponds to the maximum output voltage phase position. In Fig. 3 the control voltage has been moved to the position D' corresponding to its phase position under full load conditions. In Fig. 4 the curve D'' has been shown as substantially retarded in phase corresponding to its position on overload, or to that condition occasioned by the arc-back of another one of the parallel connected rectifiers. The curve D''' represents the magnitude and phase position of the periodic voltage of peaked wave form produced by winding 29 under an arc-back condition of the associated electric valve means. It will be appreciated that its phase position has been advanced and that the magnitude is substantially reduced due to the reversal of current flow through its associated shunt 42, thereby reducing the saturating effect of the device 25 and substantially suppressing the peaked voltage. Under this condition it will be apparent that the negative biasing potential is effective to suppress the arc.

As stated above, it is desirable in many instances to restore load to the normal electric valve means after one of the electric valve means has arced back. Following the sequence of operation described above in which it was assumed that the rectifier 1 had arced back, the increased or overload current transmitted by the other electric valves, such as electric valve means 18 of the rectifier 2, effects a substantial increase in the energization of control windings 30 of control circuit 23 and thereby retards the phase of the periodic voltages of peaked wave form induced in windings 29 during the position corresponding to curve D'' in Fig. 4. It will be appreciated that upon such retardation in phase of the control voltage that the current conducted by the electric valve means 18 will be substantially reduced, thereby affording the overload protection desired.

As soon as the circuit interrupter 32 associated with rectifier 1 is moved to the open circuit position, the overload current imposed upon the other or normal rectifiers, such as rectifier 2, will be substantially reduced and consequently the current transmitted to control windings 30 in control circuit 23 will also be reduced effecting an advancement in phase of the periodic control voltage of winding 29 corresponding approximately to the phase position of curve D' in Fig. 3. In this manner it will be appreciated that the load is automatically restored to these electric valves and that the retardation of the phase of the control voltage and its incident current limiting or protection is present so long as its associated circuit interrupting means remains closed. If the overload current due to arc-back of another electric valve means rises to a value sufficient to trip the associated circuit interrupting means to the open circuit position then, of course, that rectifier will be isolated from the system until the circuit interrupting means is reset.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current circuit, a direct current circuit, a plurality of electric valve means each connected between said circuits and each having at least one control member for controlling the current conducted thereby, a plurality of circuit interrupting means each connected in series relation with a different one of said electric valve means and each having an operating means, a plurality of current responsive means each associated with a different one of said electric valve means for energizing the operating means of the associated circuit interrupting means, a plurality of control circuits each associated with a different one of said electric valve means for energizing the associated control member, and a plurality of means each responsive to the arc-back current conducted by the associated electric valve means and each connected in series relation with a different one of the electric valve means and its associated circuit interrupting means for modifying the action of the associated control circuit to decrease the current conducted by said electric valve means only so long as the associated circuit interrupting means is in the closed circuit position and responsive to overload current for modifying the action of the associated control circuit and for decreasing the current conducted until the circuit interrupting means associated with the electric valve means subjected to the arc-back is opened by the associated operating means.

2. In combination, an alternating current circuit, a direct current circuit, a plurality of electric valve means each connected between said circuits and each having at least one control member for controlling the current conducted thereby, a plurality of circuit interrupting means each connected in series relation with a different one of said electric valve means and each having an operating means, a plurality of current responsive means each associated with a different one of said electric valve means to trip the associated circuit interrupting means when the current attains a predetermined value, a plurality of control circuits each associated with a different one of said electric valve means for energizing the associated control member, and a plurality of means each connected in series relation with a different one of the electric valve means and its associated circuit interrupting means and with a different one of said electric valve means and each responsive to both reverse current occasioned by arc-back of the associated electric valve means and overload current occasioned by arc-back of another electric valve means for modifying the action of the control circuit to reduce the current of the associated electric valve means only so long as the associated circuit interrupting means is in the closed circuit position.

3. In combination, an alternating current circuit, a direct current circuit, a plurality of parallel connected electric valve means connected between said circuits for transmitting power therebetween and each comprising at least one control member for controlling the current conducted thereby, a plurality of circuit interrupting means each connected in series relation with a different one of said electric valve means and each comprising operating means, a plurality of current responsive means arranged to actuate said operating means to open the associated circuit interrupting means upon the occurrence of an arc-back, a plurality of control circuits each associated with a different one of said electric valve means for energizing its control member, a plurality of means each connected in series relation with a different one of the electric valve means and responsive to the overload current conducted by that electric valve means occasioned by the arc-back of another electric valve means for modifying the action of the associated control circuit to decrease the current conducted by that electric valve means so long as the arc-back exists on the electric valve means subjected to the arc-back, the current responsive means of the electric valve means subjected to the arc-back condition being operative to reduce the current conducted by that electric valve means only so long as its associated circuit interrupting means is in the closed circuit position.

4. In combination, an alternating current circuit, a direct current circuit, electric valve means connected between said circuits for transmitting power therebetween and comprising an anode, a cathode and at least one control member for controlling the current conducted thereby, circuit interrupting means connected in circuit between said cathode and one terminal of said direct current circuit, a control circuit comprising means for impressing on said control member a control voltage of adjustable phase position with respect to the voltage of said alternating current circuit, means for tripping said circuit interrupting means to the open circuit position when the current transmitted by said electric valve means exceeds a predetermined value, and current responsive means connected between said cathode and said circuit interrupting means for retarding said control voltage to reduce the power output of the associated electric valve means when the current transmitted by said electric valve means attains a predetermined value and only until said circuit interrupting means is moved to the open circuit position.

5. In combination, an alternating current circuit, a direct current circuit, electric valve means connected between said circuits for transmitting power therebetween and comprising at least one control member for controlling the current conducted thereby, circuit interrupting means connected in series relation with said electric valve means, a control circuit comprising phase shifting means for impressing upon said control member a voltage adjustable in phase with respect to the voltage of said alternating current circuit, means for tripping said circuit interrupting means to the open circuit position when the current conducted by said electric valve means exceeds a predetermined value, and current responsive means connected in series relation with said electric valve means for energizing said phase shifting means when the current of said electric valve means exceeds a predetermined value to retard the phase of said control voltage and to effect thereby a decrease in the current conducted by said electric valve means only so long as said circuit interrupting means is in the closed circuit position or during the circuit interrupting operation.

6. In combination, an alternating current circuit, a direct current circuit, electric valve means connected between said circuits for transmitting power therebetween and comprising at least one control member for controlling the current conducted thereby, circuit interrupting means connected in series relation with said electric valve means, a control circuit comprising a saturable inductive device including a primary winding, a secondary winding in which there is induced a periodic voltage of peaked wave form and a control winding for controlling the phase of said periodic voltage, means for tripping said interrupting means to the open circuit position when the current conducted by said electric valve means exceeds a predetermined value, and current responsive means connected in series relation with said electric valve means and said circuit interrupting means for energizing said control winding to effect a retardation in the phase of said periodic voltage relative to the voltage of said alternating current circuit when the current transmitted by said electric valve means tends to exceed a predetermined value thereby effecting a decrease in the current conducted by said electric valve means so long as said circuit interrupting means is in the closed circuit position.

7. In combination, an alternating current circuit, a direct current circuit, electric valve means connected between said circuits for transmitting power therebetween and comprising at least one control member for controlling the current conducted thereby, circuit interrupting means connected in series relation with said electric valve means, a control circuit comprising a saturable inductive device including a primary exciting winding, a secondary winding in which there is induced a periodic voltage of peaked wave form and a control winding for controlling the phase of said periodic voltage relative to the voltage of said alternating current circuit, means for tripping said circuit interrupting means to the open circuit position when the current conducted by said electric valve means exceeds a predetermined value, and current responsive means connected in series relation with said electric valve means and said circuit interrupting means for variably energizing said control winding so that said periodic voltage has a substantial angle of lead from no load to full load range of operation of said electric valve means and a substantial angle of lag during overload to reduce the current conducted by said electric valve means until said circuit interrupting means is moved to the open circuit position.

8. In combination, an alternating current circuit, a direct current circuit, electric valve means connected between said circuits for transmitting power therebetween and comprising at least one control member for controlling the current conducted thereby, circuit interrupting means connected in series relation with said electric valve means, a control circuit comprising a saturable inductive device including a primary exciting winding, a secondary winding in which there is induced a periodic voltage of peaked wave form and a control winding for controlling the phase of said periodic voltage relative to the voltage of said alternating current circuit, means for tripping said circuit interrupting means to the open circuit position when the current conducted by said electric valve means exceeds a predetermined value, and current responsive means connected in series relation with said electric valve means for variably energizing said control winding to shift the phase of said control voltage from the position corresponding to the maximum output voltage of said electric valve means to a substantial lagging position until the circuit interrupting means is moved to the open circuit position.

9. In combination, an alternating current circuit, a direct current circuit, electric valve means connected between said circuits for transmitting power therebetween and comprising at least one control member for controlling the current conducted thereby, a control circuit comprising means including a control winding for impressing on said control member a periodic voltage adjustable in phase, and means responsive to the magnitude and polarity of the current transmitted by said electric valve means for variably energizing said control winding to retard the phase of said periodic voltage under overload conditions and to suppress said periodic voltage under reverse current conditions.

10. In combination, an alternating current circuit, a direct current circuit, electric valve means connected between said circuits for transmitting power therebetween and being of the type comprising an ionizable medium and at least one control member for controlling the current conducted thereby, means for impressing on said grid a negative unidirectional biasing potential sufficient to render said electric valve means nonconductive, a control circuit for impressing on said control member a periodic voltage of adjustable phase position comprising a saturable inductive device having a control winding, said periodic voltage normally being of sufficient magnitude to overcome the effect of said biasing potential, and means responsive to the magnitude and polarity of the current conducted by said electric valve means for retarding in phase said periodic voltage upon overload and for advancing in phase and suppressing in magnitude said periodic voltage under reverse current conditions so that said biasing potential is effective to suppress the arc within said electric valve means.

11. In combination, an alternating current circuit, a direct current circuit, electric translating apparatus connected between said circuits for transmitting power therebetween and comprising an electric valve means having at least one control member, a control circuit for impressing a variable phase periodic voltage on said control member, a circuit interrupting means connected in series relation with said translating apparatus, and means responsive to the current conducted by said translating apparatus for effecting a retardation of said periodic voltage to decrease the power transmitted by said translating apparatus only so long as said circuit interrupting means is in the closed circuit position.

AUGUST SCHMIDT, Jr.